INVENTORS.
ALTEN E. WHITECAR &
RICHARD J. BARTLETT

ATTORNEYS

Sept. 24, 1957 R. J. BARTLETT ET AL 2,807,289
APPARATUS FOR FILLING CONTAINERS WITH POWDER
Filed May 11, 1953 7 Sheets-Sheet 3

INVENTORS.
ALTEN E. WHITECAR &
RICHARD J. BARTLETT
BY
ATTORNEYS

Sept. 24, 1957     R. J. BARTLETT ET AL     2,807,289
APPARATUS FOR FILLING CONTAINERS WITH POWDER
Filed May 11, 1953     7 Sheets-Sheet 4

INVENTORS.
ALTEN E. WHITECAR &
RICHARD J. BARTLETT
BY
ATTORNEYS

Sept. 24, 1957 R. J. BARTLETT ET AL 2,807,289
APPARATUS FOR FILLING CONTAINERS WITH POWDER
Filed May 11, 1953 7 Sheets-Sheet 5

INVENTORS.
ALTEN E. WHITECAR &
RICHARD J. BARTLETT
BY
ATTORNEYS

Sept. 24, 1957 R. J. BARTLETT ET AL 2,807,289
APPARATUS FOR FILLING CONTAINERS WITH POWDER
Filed May 11, 1953 7 Sheets-Sheet 7

INVENTOR.
ALTEN E. WHITECAR &
RICHARD J. BARTLETT
BY
ATTORNEYS

United States Patent Office 2,807,289
Patented Sept. 24, 1957

2,807,289

APPARATUS FOR FILLING CONTAINERS WITH POWDER

Richard J. Bartlett, Chalfonte, Pa., and Alten E. Whitecar, Westville, N. J., assignors to Smith, Kline & French Laboratories, Philadelphia, Pa., a corporation of Pennsylvania Application May 11, 1953, Serial No. 354,190

7 Claims. (Cl. 141—172)

This invention relates to apparatus for filling containers with powder and is a continuation-in-part of our copending patent application Serial No. 316,592, filed October 24, 1952 now abandoned.

In filling small bottles or other containers with a powder and particularly, when the powder is an antibiotic powder, the flow of the powder is relatively slow. Conventional powder metering apparatus will mechanically discharge a measured quantity of powder quite rapidly and automatic apparatus for accomplishing this discharge will discharge repeated metered charges of powder in fairly rapid succession. The period of time required for passing the metered quantity of powder through the neck of a small bottle as a result of gravitational force alone is considerably greater than the period of time required for discharging the metered quantity of powder mechanically.

It is, therefore, an object of this invention to provide an apparatus by means of which a greater period of time is allowed for a quantity of powder to enter a bottle or other container than is required for metering apparatus to discharge that quantity of powder.

It is a further object of this invention to provide automatic apparatus in which a succession of bottles are filled with a powder and discharged from the apparatus upon a moving conveyor belt.

It is a further object of this invention to provide a control for maintaining a relatively constant level of powder in the vessel from which metered quantities of powder are being discharged in order to assure uniform metering of the discharged powder.

Figure 1:
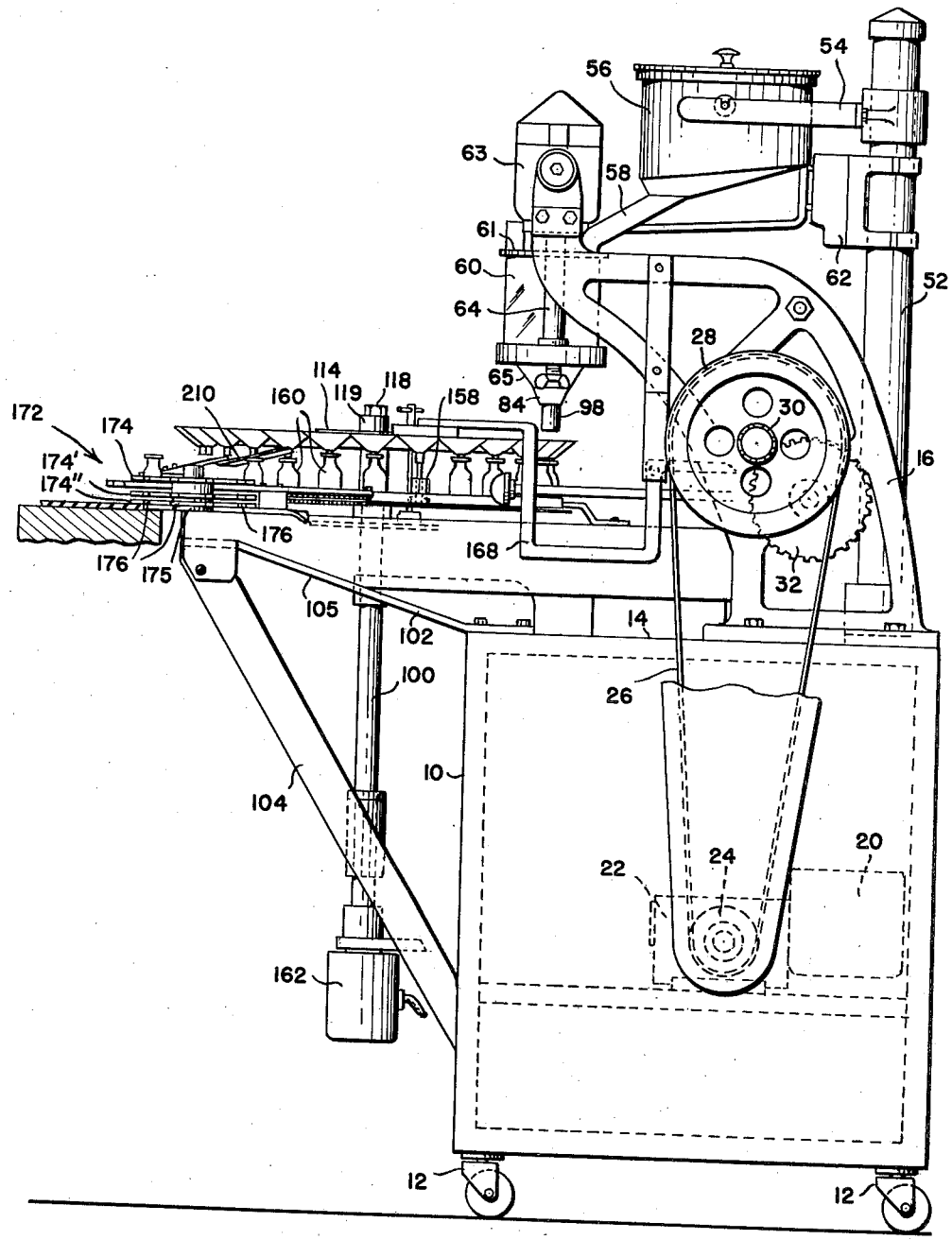
Figure 2:
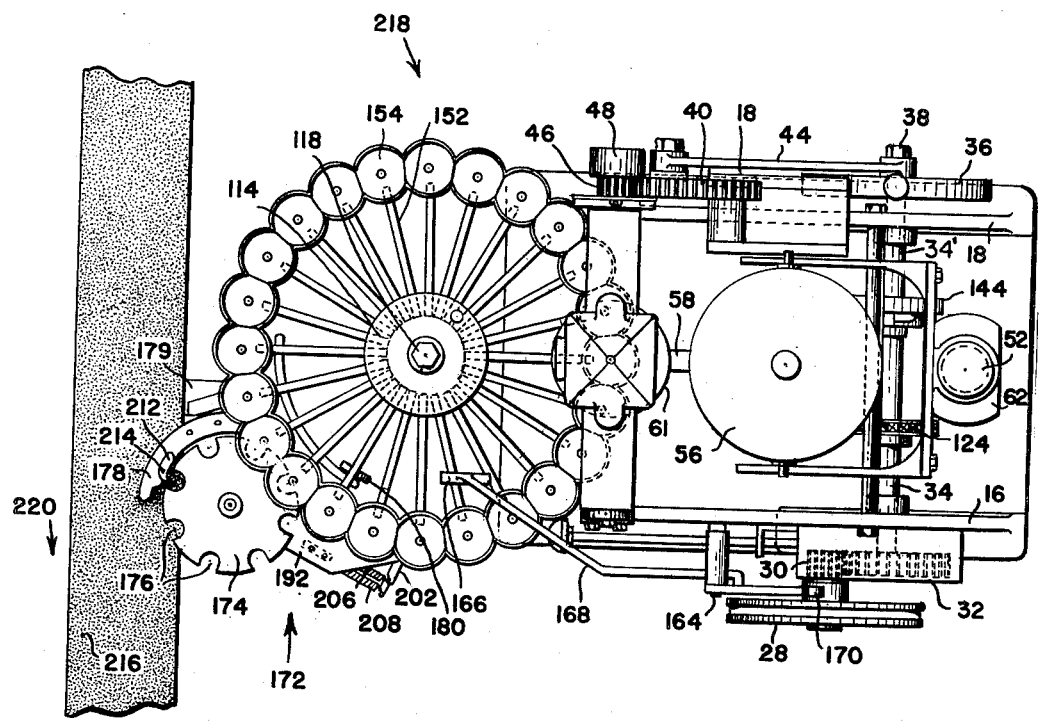
Figure 3:
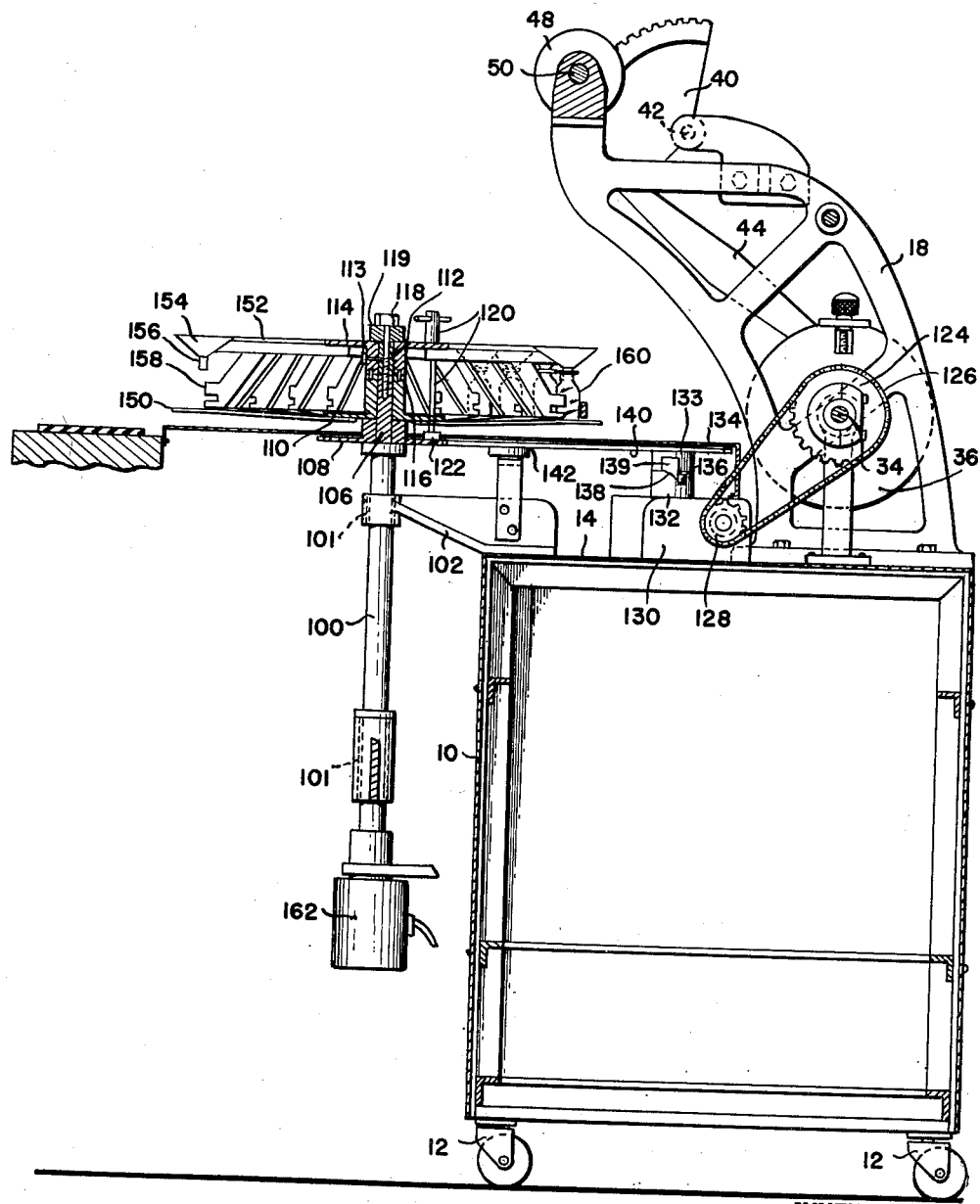
Figure 4:
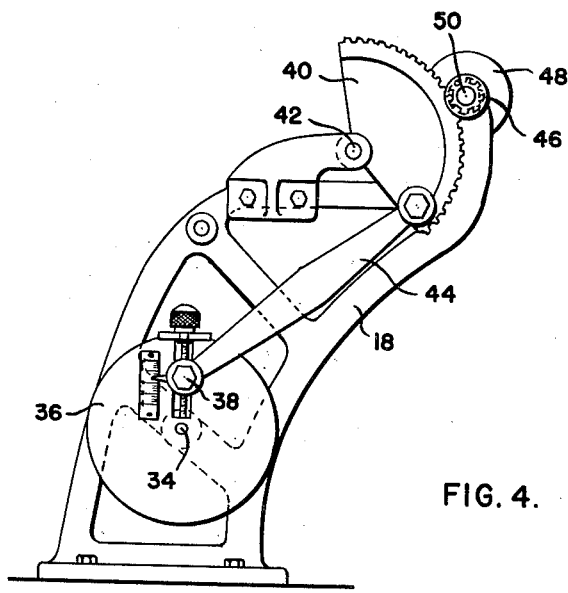
Figure 5:
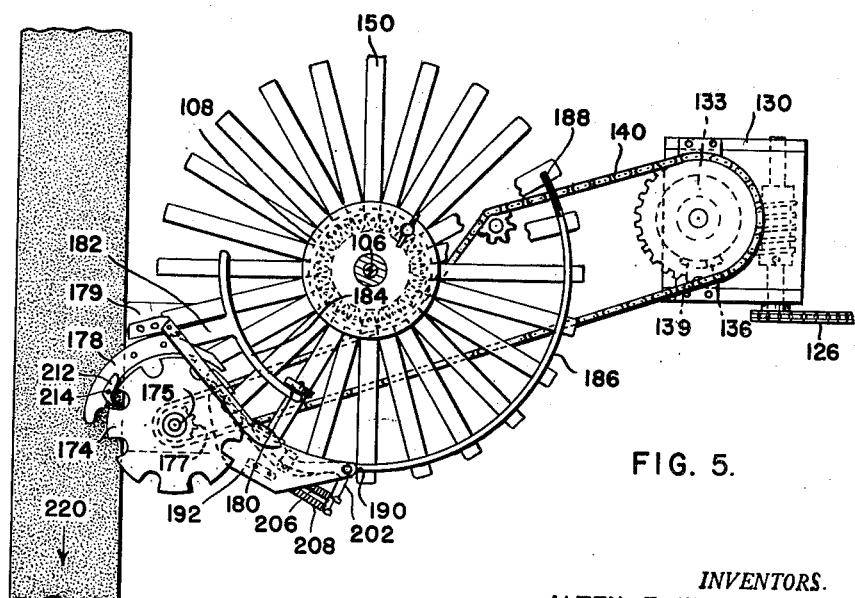
Figure 6:
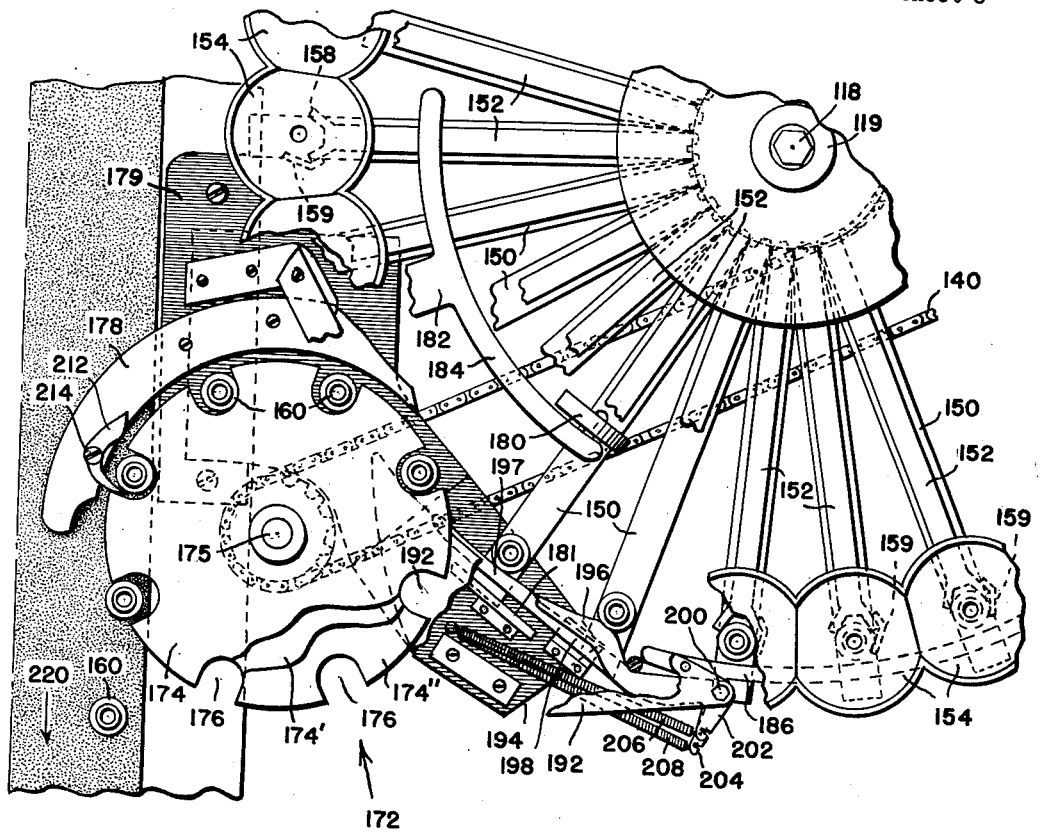
Figure 7:
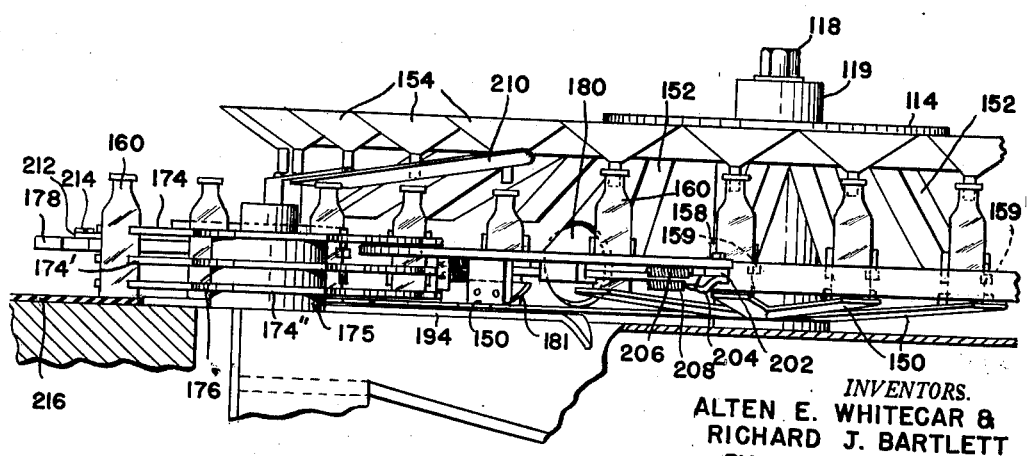
Figure 8:
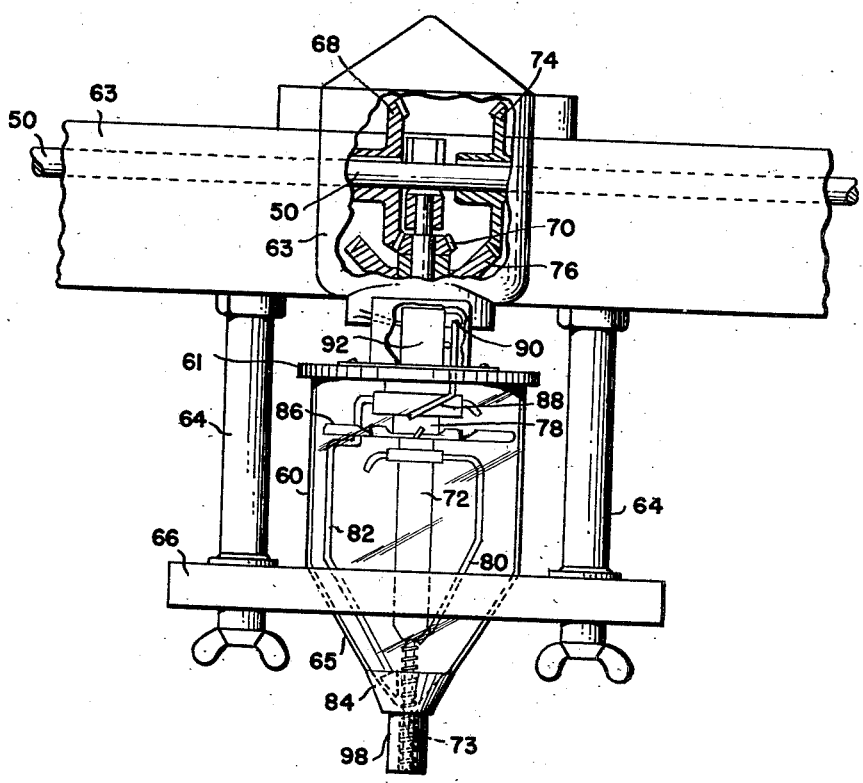
Figure 9:
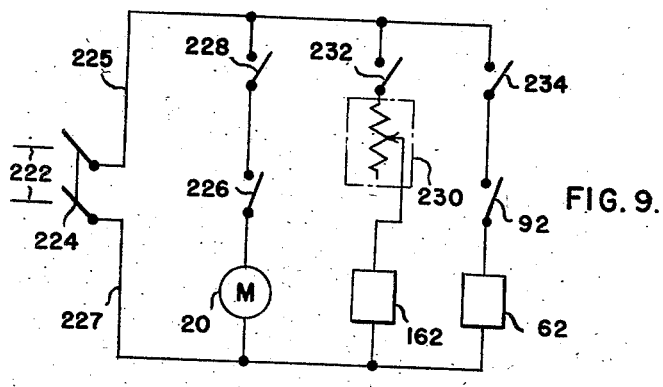
Figure 10:
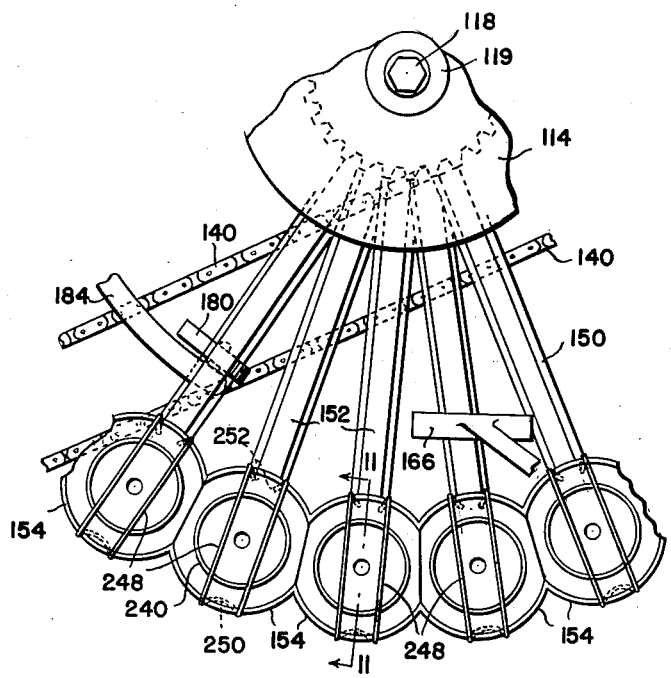
Figure 11:
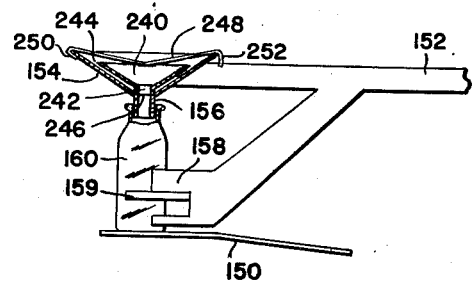

These and other objects of the invention will become apparent from the following description when read in conjunction with the accompanying drawings, in which:

Figure 1 is a side elevation of the complete apparatus;
Figure 2 is a top view of the apparatus;
Figure 3 is a vertical section of the apparatus;
Figure 4 is a fragmentary elevation of a portion of the apparatus partly in section;
Figure 5 is a fragmentary plan view of a portion of the appartus;
Figure 6 is an enlarged showing of a portion of the apparatus shown in Figure 5;
Figure 7 is an elevation of the apparatus shown in Figure 6;
Figure 8 is a fragmentary front view of the apparatus partly in section;
Figure 9 is a schematic wiring diagram of the electrical circuit involved in the apparatus;
Figure 10 is an enlarged showing of a portion of the apparatus shown in Figure 2 employing a modification thereof; and
Figure 11 is a vertical section taken on the trace 11—11 of Figure 10.

The powder filling apparatus includes an enclosed framework 10 which is portably mounted on castors 12 and provides a flat upper surface 14 upon which a pair of supporting arms 16 and 18 are mounted.

Within the framework 10 there is supported an electric motor 20 which, through a speed reducer 22, drives a pulley 24. A belt 26 passing over the pulley 24 drives a pulley 28 which is mounted on a rotatable shaft supported by suitable bearings in the frame member 16. A gear 30 is affixed to the pulley 28 and meshes with a gear 32 mounted on a shaft 34. Shaft 34 is connected to shaft 34' through a clutch 144. The shafts 34 and 34' extend coaxially in end to end relation between the frame members 16 and 18 and are rotatably mounted on suitable bearings therein.

On the opposite end of the shaft 34' from the clutch 144 there is mounted a disc 36. The disc 36 includes an adjustably mounted eccentric pivot 38. A segment gear 40 is pivotally mounted at 42 and supported by the upper end of the frame 18. The gear 40 is connected to the eccentric pivot 38 by means of an arm 44. The segment gear 40 meshes with a pinion gear 46 which is rotatably mounted on the shaft 50 and connected through an overrunning clutch 48 to a shaft 50. The arrangement is such that, as the shaft 34 rotates, oscillatory motion is imparted to the arm 44 by the pivot 38. The degree of motion of the arm 44 depends upon the setting of the adjustable eccentric pivot 38. The oscillating arm causes an oscillation of the segment gear 40. The shaft 50 receives intermittent rotation as a result of the oscillatory motion of the gear 46 and the action of the overrunning clutch 48 which permits the shaft 50 to be driven in only one direction.

A vertically extending post 52 is mounted on the upper surface 14 of the framework 10. A fork 54 attached to the upper end of the post 52 supports a powder storage vessel 56. A spout 58 extends from the lower portion of the storage vessel 56 and is adapted to carry powder from the vessel 56 through a bore in the plate 61 and into a container 60. An electric vibrator 62 of conventional construction is mounted on the post 52 and is in engagement with the storage vessel 56. The vibrator is provided to induce the flow of powder from the vessel 56 through the spout 58 and into the container 60.

The shaft 50 is rotatably mounted in a housing 63 which extends between and is supported by the uppermost portions of the frame members 16 and 18. The circular plate 61 is supported from below the housing 63 and covers the container 60. Support posts 64 extend downwardly from the housing 63 and have removably attached to the lower ends thereof a plate 66. The plate 66 is provided with a conical bore adapted to fit a conical lower portion 65 of the container 60 thereby supporting the container 60 and urging it upwardly against the cover plate 61.

A bevelled gear 68 attached to the shaft 50 within the housing 63 is in mesh with a pinion 70 which is connected to an uppermost extension of a shaft 72 which extends downwardly into the container 60. A bevelled gear 74 attached to the shaft 50 is in mesh with a bevelled gear 76 which is affixed to a sleeve surrounding the upper portion of the shaft 72 and having its lower end 78 extending downwardly into the container 60.

The two shafts 72 and 78 will obviously be rotated in opposite directions as a result of the bevelled gear arrangements just described and these opposite rotations will take place intermittently in response to the intermittent drive of the shaft 50 through the oscillating segment gear 40 and the overrunning clutch 48.

The lower end of the shaft 72 within the container 60 is provided with a worm or screw 73 which extends downwardly into discharge nozzle 98 of the container. It will be evident that, if the container 60 contains a powder, metered quantities of powder will be discharged from the container with each series of rotations of the shaft 72 and, by adjusting the adjustable eccentric 38 shown in Figure 4, the number of rotations of the screw 73 in the discharge nozzle of the container 60 may be adjusted and thus the quantity of powder discharged with each oscillation of the segment gear 40 may be regulated. In order to keep the powder suitably arranged within the container 60 and to provide for uniformly metered discharged quantities by the worm, there is provided a stirrer 82 having affixed to the lower end thereof a paddle 84. The stirrer 82 is attached to the shaft 78 and rotates in a direction opposite to the direction of the feed screw 73. An additional stirrer 80 is attached to the shaft 72. This stirrer rotates in the same direction as the shaft 72 and oppositely from the direction of rotation of the stirrer 82.

As previously mentioned, this apparatus is particularly adapted for use with powders, such as antibiotic powders, having poor flow characteristics. The powder supply is kept within the reservoir 56 and flows downwardly through the spout 58 into the container 60. The vibrator 62 previously described is provided to induce the flow of powder from the reservoir 56 into the container 60. It has been found that the most satisfactory operation of the feed screw 73 occurs when a constant level of powder is maintained within the container 60 and, accordingly, there is provided therein a vaned disc 86 and a vane switch arm 88. The vaned disc 86 is rotated with the shaft 78 and, when the powder in the container 60 reaches the level of the vaned disc 86, the powder is carried forwardly by the vanes of the vaned disc as the disc rotates to the left, as viewed in Figure 8, and is brought to bear against the underside of the vane switch arm 88. The switch arm 88 extends upwardly through the plate 61 and is pivoted at 90 on a pivot affixed to a limit switch 92. As will be hereafter described in connection with Figure 9, the switch 92 is connected in series with the vibrator 62 and thus, when the powder in the container 60 reaches the level of the vaned disc 86, action of the vibrator 62 is arrested and the powder having poor flow characteristics will substantially cease flowing from the reservoir 56 into the container 60. As soon as the powder within the container 60 falls below the vanes of the disc 86, the vane switch arm 88 will drop downwardly and the switch 92 will again close thereby energizing the vibrator 62 and cause the flow of powder from the vessel 56 to the container 60 to be resumed. The action of this flow control is to maintain a substantially constant level of powder with the container 60 and thereby to give rise to a more uniform and reliable discharge of metered quantities of powder by the discharge screw 73.

The metered quantities of powder discharged from the container 60 are fed into bottles. Antibiotic powders for example, such as penicillin, are generally packed in small bottles or vials of the order of an inch and a half high and having a one quarter inch neck opening. These powders, as has been previously noted, have poor flow characteristics. It will be evident that the powder will not flow through the neck of such a small bottle at the same rate at which it is discharged from the container 60 by the screw 73. Accordingly, a bottle filling apparatus, as will now be described, has been provided.

A vertically extending member 100 positioned in front of the framework 10 is supported by a bracket 102 affixed to the upper surface 14 of the framework 10. The lower end of the member 100 is supported by inclined braces 104 which are further provided for purposes hereinafter described. A stationary shaft 106 rises out of the member 100 and rotatably mounted thereon is a sprocket 108. Resting upon the sprocket 108 and rotatably mounted on the shaft 106 is a lower flanged member 110 having an upwardly extending sleeve portion. An upper flanged member 114 having a downwardly extending sleeve portion is supported by the upper end of the sleeve portion of the lower flanged member 110 and is rotatably connected thereto by pins 116. A bushing 112 is held in position within the upper flanged member 114 by means of a screw 113. The upper flanged member 114 and the lower flanged member 110 are urged downwardly against the sprocket 108 by a bolt 118 passing through a disc 119 and threaded into the shaft 106. A pin 120 extends downwardly through the flange of the upper flanged member 114, the flange of the lower flanged member 110 and into a threaded block 122 affixed to the sprocket 108.

A sprocket 124 is mounted on the shaft 34. A speed reducer 130 is mounted on the upper surface 14 of the portable member 10. A chain 126 couples the sprocket 124 mounted on the shaft 34 with a sprocket 128 affixed to the speed reducer 130. A shaft 132 extends upwardly out of the speed reducer. An independent upper portion 133 of the shaft 132 has attached to its upper end a sprocket 134. The shaft 132 is provided with a dog 136 and the independently rotatable upper portion includes an inclined cam face 138 and an axially extending face 139. By means of this arrangement there is provided an overrunning clutch in order that the drive mechanism acting through the shaft 34 and the speed reducer 130 may drive the sprocket 134. The overrunning clutch mechanism permits advance of the sprocket 134 when the driving mechanism is stationary. The sprocket 134 drives the sprocket 108 by means of a chain 140. An idler 142 is provided in order to adjust the tension of the chain 140.

Attached to the flange of the lower flanged sleeve 110 are a plurality of radially extending spring leaf members 150. Attached to the flange of the upper flanged sleeve member 114 are a plurality of radially extending support arms 152. Funnels 154 are attached to the outer ends of and supported by each of the support arms 152. Each of the funnels 154 is provided with a spout 156 and is positioned above the flexible spring leaf 150. Also supported by the arms 152 are recessed bottle positioning members 158. The arrangement is such that, when a flexible spring leaf 150 is depressed, a bottle 160 may be inserted into its associated bottle positioner 158 and lifted upwardly with the spout 156 of an associated funnel 154 entering the neck of the bottle 160, and the spring leaf 150, when released, will bear against the bottom of the bottle urging the bottle into position against the funnel.

As the ring of funnels 154 is rotated, an operator positioned on the left-hand side of the apparatus, the upper side as viewed in Figure 2, will place empty bottles under the funnels as the ring of funnels rotates, the direction of rotation being clockwise as viewed in Figure 2.

As the ring of funnels pass below the feed screw 73 in the container 60, successive discharges of powder are deposited upon the funnels. The arrangement of the apparatus is such that one funnel is passing under the container 60 during the period of discharge of a metered quantity of powder and thus each discharge of powder lands completely in and only in one funnel. The rotation of the ring of funnels is, however, continuous and, after the metered quantity of powder is deposited in a funnel, the ring of funnels rotates carrying away the loaded funnel and carrying into position an empty funnel. As the ring of funnels rotates, the powder flows downwardly through the neck of each of the loaded funnels into the bottle associated therewith.

In order to induce this flow, a pair of vibrators is provided. One is a conventional electrical vibrator 162 mounted on the lower end of the member 100. The vibration produced by the vibrator 162 is carried upwardly through the member 100 which is mounted in rubber bushings 101 in the brackets 102 and 104 and passes outwardly through the support arms 152 to the funnels 154. To further induce the flow of powder through the funnels a mechanical hammer is mounted on a pivot mounting 164 attached to the frame 16 as shown in Figure 2. A hammer block 166 is attached to the left-hand end of a hammer arm 168 which is pivotally mounted on the pivot 164. The right-hand end of the arm 168, as viewed in Figure 2, is adapted to engage a projection 170 attached to the hub of the pulley 28. The rate of rotation of the pulley 28 and the rate of rotation of the funnel ring are such that the hammer is actuated by the projection 170 and strikes four blows upon each funnel support arm. This vibration in conjunction with the vibration caused by the electrical vibrator 162 induces the flow of powder through the small necks of the funnels and into the bottles associated therewith, and by the time each of the funnels has reached the bottle discharge mechanism, indicated generally at 172 in Figure 2, all of the powder has descended from each of the funnels into its associated bottle.

Before describing the bottle discharge mechanism in detail, it should be noted that, as previously mentioned, a disconnect clutch 144 is provided on the drive shaft 34—34′. This disconnect clutch is to disconnect the powder discharge drive mechanism, as shown in Figures 4 and 8, and to prevent operation thereof during discharge of the bottles in the funnel ring when it is desired to terminate the operation of the filling machine such as, for example, at the end of a working shift or when it is desired to reload the powder reservoir.

The bottle discharge apparatus, shown generally at 172, includes a rotatable wheel having aligning upper intermediate and lower portions 174, 174′ and 174″, respectively, each having cutouts 176 adapted to receive the bottles which are rotating with the funnel wheel assembly. The cutout wheel is rotatably mounted on a shaft 175 which is supported by suitable brackets from below a plate 179. The plate 179 is supported by arms 104 and 105 affixed to the framework 10. A guide plate 178 extends around a portion of the circumference of the wheel 174 and is adapted to engage the sides of the bottles. The guide plate 178 is mounted on the plate 179. A roller 180 is mounted on a support arm 182 also mounted on the plate 179 and is adapted to depress the spring leaf members 150 as they approach but before they reach the forward end of the guide plate 178. Depression of a spring leaf 150 permits the bottle supported thereby to fall away from the neck of its associated funnel. With the spring leaf in this lower position, as is maintained by the lower surface of portion 184 of the roller support arm, the bottle, upon engagement with the guide plate 178, may be carried outwardly by the cutout wheel 174, the bottles being urged therein by extending arms 159 attached to the trailing edge of each of the bottle positioners 158. The arms 159 pass between the two discs 174 and 174′ of the cutout wheel.

A semicircular guide strip 186 is provided to hold the lower ends of the bottles in position on the spring leaf 150 as the funnel wheel assembly rotates. The leading end of the guide strip 186 is provided with a rubber tip 188 as a safety measure to avoid injury to an operator in the event that an operator's hand or finger should become engaged between a bottle and the guide strip. The guide strip terminates at 190. Following the guide strip there is provided between an upper plate 192 and a lower plate 194, which is an extension of plate 179, a pair of guide fingers 196 and 198 which are pivotally mounted at 200 by means of a pin extending down from the plate 192. The fingers 196 and 198 are provided with approximately right angle extending members 202 and 204, respectively, which are connected to spring 206 and 208, respectively, which urge the guide fingers inwardly about the pivot 200 and against bottles 160. The first or upper finger 196 is adapted to engage one bottle and, at the time that bottle passes off the end of the finger 196, the next bottle is beginning to engage the finger. The second or lower finger 198 has its outer end 197 formed to lie parallel with and on substantially the same plane as the finger 196. The finger 197 is so positioned that, as a bottle passes beyond the end of the finger 196, it is engaged by the finger 197. The length of the finger 197 is also such as to engage only one bottle at a time. Thus, between the two fingers 196 and 197, two bottles are at all times urged into position against their respective bottle guides 158.

The bottles are thus held in position to be properly engaged by the cutouts 176 in the cutout wheel 174. The cutout wheel is driven by a sprocket gear 177 which is in mesh with the chain 140 which is driving the funnel assembly wheel. Thus the positions of the recesses 176 of the cutout wheel 174 are synchronized with the positions of the bottles coming in contact therewith as the funnel wheel is rotated and the bottles are held in proper alignment against their respective retainers by the fingers 196 and 197 as they mesh with the cutout wheel. Accordingly, when the bottles pass inside the guide plate 178, they are engaged between the rotating cutout wheel and the guide plate and carried outwardly from the funnel wheel.

The roller 180 and the roller support arm 184 depress the spring leaf member 150 during their passage under the fingers 196 and 198 and a cam plate 181 insures that the outer end of the spring leaf is depressed sufficiently to clear the lower portions of the cutout wheel 174.

A stripper knife 210 is provided to prevent any of the bottles from hanging up as a result of their having been jammed against the neck of their associated funnels. The stripper knife is attached to the plate 179 and extends diagonally upwardly so as to engage the upper rim of the first bottle following the depression of a spring leaf 150 in the event that that bottle should not fall down from the funnel as the leaf is depressed. The inclined knife forces the bottles downwardly as they are carried thereagainst by the rotating funnel wheel.

An angle strip 212 is pivotally mounted at 214 on the guide plate 178 and is provided in its pivot with sufficient friction so that, as bottles carried around by the cutout wheel come into engagement therewith, the bottles are pressed inwardly into the wheel recesses as they pass by the angle strip. A bottle in passing the angle strip will first bear against the upper or right-hand end of the strip, as viewed in Figure 6, causing the strip to rotate in a counterclockwise direction around its pivot mounting thereby moving the left-hand end of the angle strip inwardly. As the bottle proceeds to be carried around, the bottle will engage the left-hand end of the angle strip and cause the angle strip to rotate in a clockwise direction moving the right-hand end of the angle strip inwardly into a position to be engaged by the next succeeding bottle. The bottles are thus twice urged into proper vertical position between the upper and lower discs of the cutout wheel 174 as the wheel rotates. This urging occurs as they are carried beyond the plate 179 and onto a conveyor belt 216. The speed of the conveyor belt 216 is preferably selected so that the bottles are carried along by the conveyor belt at at least the same speed that they are moved by the rotating cutout wheel 174 and thus, as the wheel rotates, the bottles are carried away by the moving belt and left standing thereon.

Those portions of the apparatus coming in contact with the powder are preferably formed of glass, stainless steel or other material which will not react with or contaminate the powder.

The operation of the apparatus may now be described. Powder to be filled into bottles is placed within the storage container 56 and, as a result of gravity and vibration being produced by the vibrator 62, the powder flows downwardly through the spout 58 into the container 60. Powder within the container 60 is discharged therefrom through the discharge nozzle 98 by rotation of the feed screw 73 which is adapted to rotate a predetermined number of revolutions at successive intermittent periods as determined by the oscillating rack gear arrangement shown in Figure 4. The level of the powder within the container 60 is maintained by the vaned wheel 86 which, when powder reaches that level, carries the powder upwardly against the vane switch blade 88 and actuates the limit switch 92. The limit switch 92, when actuated, opens the circuit through the vibrator 62 and thereby causes the vibrator to cease vibrating. Due to the fact that these powders have poor flow characteristics, the powder ceases to flow from the storage vessel 56 into the container 60 when the vibrator has stopped vibrating. Thus the vaned wheel 86 and the vane switch 88 serve effectively to maintain a predetermined level of powder in the container 60.

Intermittent feeding of powder by the feed screw 73 through the discharge nozzle 98 is synchronized with the position of the funnel wheel in such a manner that each metered quantity of powder discharged from the container 60 is dropped completely within a single funnel.

Referring to Figure 2, an operator is stationed to insert bottles between the leaf springs 150 and the funnels 154 in the region generally indicated by the numeral 218. The bottles are then carried by the funnel wheel in a clockwise direction, as viewed in Figure 2, and pass under the discharge spout of the container 60 where they receive a quantity of powder. The bottles are then carried beyond the container 60 and, as a result of the vibration caused by the vibrator 162 and the hammer 166, the powder flows downwardly from the funnels through the necks of the funnels and into the bottles associated therewith. By the time each of the bottles has been carried, as a result of the clockwise rotation of the funnel wheel, to the discharge wheel 174, all of the powder in its associated funnel will have passed downwardly from the funnel into the bottle. It should be noted that the time provided for this passage of powder from a funnel into a bottle is that time required for the funnel wheel to rotate for that portion of a revolution during which a single funnel and its associated bottle will pass from below the container 60 to the point where the roller 180 depresses its supporting spring leaf 150 and permits the bottle to fall away from its associated funnel.

The bottles approaching the discharge wheel 174 are urged against their respective guide members 158 by means of the fingers 196 and 197 and thus, as the bottles are engaged by the recesses 176 in the wheel 174, they are properly positioned. The stripper knife 210 is provided to insure dropping of each of the bottles away from its associated funnel whereupon, as a result of the counterclockwise rotation of the wheel 174, the bottles are carried away from the funnel wheel to a position over the conveyor belt 216. The conveyor belt 216 travelling in a direction, as indicated by the arrow 220 in Figure 2, carries the filled bottles away from the cutout wheel.

Referring to the wiring diagram of Figure 9, the apparatus is connected to 110 volt single phase current supply lines 222 through a conventional disconnect switch 224 to lines 225 and 227. The motor 20 is connected across the lines 225 and 227 through an emergency shut-off switch 226 which is preferably provided in the form of an operator foot switch not shown in the figures but of conventional type which, upon depression, will open the circuit and arrest the operation of the complete machine. A manually operated switch 228, for example a toggle switch, may be mounted in any convenient place preferably the rear panel of the framework 10 and provides the normal motor control switch. The funnel vibrator 162 is connected through a variable resistance means 230 by means of which the intensity of vibration may be adjusted and through a manually operated switch 232 which may be mounted on the rear panel adjacent to the switch 228. The hopper vibrator 62 is connected through the vane controlled switch 92, as has been previously described, and through a manually controlled switch 234 which may also be mounted on the rear panel and adjacent to the switches 230 and 232. Thus any of the three circuits may be independently controlled by switches at the rear of the apparatus and the entire apparatus may be disconnected by opening the main disconnect switch 224.

While the bottles 160 into which the powder is to be, is being or has been filled are not shown in all of the figures in the drawings, it will be evident that the bottles have been variously omitted from their normal positions in order to permit clear showing of a structure involved for carrying the bottles. It will be evident, for example, in Figure 2, that a continuous stream of bottles will exist in the funnel wheel from approximately the region indicated by the numeral 218 all the way around the wheel in a clockwise direction to the bottle discharge wheel 174 and that bottles will exist in the three upper left-hand recesses of this discharge wheel. Furthermore, a string of bottles will thereafter appear on the belt 216 moving downwardly, as viewed in Figure 2, as the belt 220 progresses.

In the operation of the machine described, it has been found that in certain cases there is a tendency for the powder contained within the funnels 154 to creep up the radially inward edge of each funnel of the ring of funnels. This appears to result from the fact that vibrations reaching the funnel from the vibrator 162 are transmitted to the funnel through the radially extending funnel support arms 152. In order to relieve this condition, insert funnels 240 are set inside of each of the funnels 154. The insert funnels 240 have a downwardly extending spout insert 242 the lower end of which rests upon the lowermost portion of the wall of the funnel 154 adjacent to the spout 156 of the funnel 154 as indicated at 246. The upper rim of the insert funnel 240 is of lesser diameter than the portion of the funnel 154 adjacent thereto and thus there is provided a clearance as indicated at 244 between the upper rim of the funnel 240 and the adjacent portion of the funnel 154. It will be evident that generally the insert funnel will be in contact with the funnel 154 at one point on its rim due to the fact that the insert funnel is loosely resting on its spout in the funnel 154 and is free to fall to one side.

A generally U-shaped spring clip 248 is positioned over the top of the funnel 154 in order to prevent the insert funnel 240 from being displaced from within the outer funnel. The spring clip is spaced from the top of the insert funnel. The clip is provided with an inwardly turned base portion 250 and inwardly turned end portions 252 in order to insure its permanent engagement with the funnel 154. The spring clip is, however, of such a nature that it can be readily removed when it is desired to remove the insert funnel 240 from its associated funnel 154.

In operation of the machine employing the insert funnel vibration will be delivered to the insert funnel upwardly through its spout, the insert funnel teetering on its spout and vibrating with respect to the funnel 154. Thus, in this arrangement of the apparatus, the vibration is carried upwardly into the insert funnel through its spout and will tend to induce a flow of powder downwardly through the insert funnel and through its spout. This is a highly desirable feature in that many powders including the antibiotic powders mentioned above have poor flow characteristics.

It will be evident that powder will not climb out of a funnel having steep side walls. On the other hand, when powders having poor flow characteristics are deposited into a funnel having steep side walls, there is a tendency for the powder to jam or bridge across the lower end of the funnel adjacent to the neck of the funnel. On the other hand, in a funnel having a flat slope, this jamming or bridging is not experienced. However, in the case of a flat slope, the tendency for the powder to climb up the wall of the funnel is more marked. Thus, with the combination of funnels described herein, the non-bridging advantages of a flat slope funnel may be achieved while simultaneously the tendency of the powder to creep up one side of the funnel is overcome. Thus the combination produces an improved delivery of powder through the funnel.

In the event that, if for any reason powder should find its way between the wall of the funnel 240 and the wall of the funnel 154 adjacent thereto, the vibration of the two funnels and the non-rigid mounting of the insert funnel in the outer funnel will cause such powder to flow downwardly and pass between the end of the spout of the insert funnel and the outer funnel, through the spout 156 of the outer funnel and into the container 160 associated therewith.

It will be evident that, while the parts 240 and 154 are shown and described as funnels, they need not be of conical form but may be of any form of tapered container or receiver such as, for example, an inverted pyramid. Each of the receivers is preferably provided with a downwardly extending spout, the spout of the outer receiver being adapted to cooperate with the neck of a bottle or other suitable powder container and the spout of the inner receiver being adapted to rest upon means for supporting the inner receiver.

It will be evident that the foregoing apparatus provides a uniformly metered discharge of powder with each operation of the discharge screw in the discharge nozzle 98 in the container 60 and also affords extended time for the flow of the metered quantity of powder from each of the funnels into its receiving bottle, the extended period of time for the flow from the funnel into the bottle being considerably greater than the period of time during which a metered quantity of powder is discharged from the container 60. Furthermore, the apparatus provides for automatic removal of bottles from the rotating funnel wheel and, in addition thereto, means in the form of a conveyor belt 220 for carrying the bottles away from the discharge mechanism. It will be evident that various modifications may be made in the embodiment of the invention disclosed herein without departing from the scope of the invention as set forth in the following claims.

What is claimed is:

1. Apparatus for filling containers with powder comprising means containing a supply of powder, means for discharging powder from said supply containing means, a plurality of powder receivers in circular arrangement, said circular arrangement being rotatably mounted and positioned to pass said receivers successively under said powder discharging means when rotated, means for rotating said circular arrangement, means associated with each of said powder receivers for positioning a container into association therewith, means for removing each of the containers from association with its respective powder receiver after its receiver has advanced a predetermined distance from the location at which it received powder from the powder discharge means, each of said receivers including a tapered receiver having a spout extending downwardly from its lower end, and means engaging said spout and supporting said spout and its associated receiver, and means for vibrating said supporting means.

2. Apparatus for filling containers with powder comprising means containing a supply of powder, means for discharging powder from said supply containing means, a plurality of powder receivers in circular arrangement, said circular arrangement being rotatably mounted and positioned to pass said receivers successively under said powder discharging means when rotated, means for rotating said circular arrangement, means associated with each of said powder receivers for positioning a container into association therewith, means for removing each of the containers from association with its respective powder receiver after its receiver has advanced a predetermined distance from the location at which it received powder from the powder discharge means, each of said receivers including a tapered receiver having a spout extending downwardly from its lower end, and means upon which said spout rests supporting said spout and its associated receiver, and means for vibrating said supporting means.

3. Apparatus for filling containers with powder comprising means containing a supply of powder, means for discharging powder from said supply containing means, a plurality of powder receivers in circular arrangement, said circular arrangement being rotatably mounted and positioned to pass said receivers successively under said powder discharging means when rotated, means for rotating said circular arrangement, means associated with each of said powder receivers for positioning a container into association therewith, means for removing each of the containers from association with its respective powder receiver after its receiver has advanced a predetermined distance from the location at which it received powder from the powder discharge means, each of said receivers including a receiver having a spout extending downwardly from its lower end and a second receiver of tapered form and having a spout extending downwardly and resting upon the interior lower portion of the first mentioned receiver, and means for vibrating said circular arrangement of rotatably mounted receivers.

4. Apparatus for filling containers with powder comprising means containing a supply of powder, power driven rotating means for delivering successive metered quantities of powder from said supply containing means, a powder reservoir, a passage connecting said powder reservoir and said supply containing means, means for inducing flow of powder from said reservoir and through said passage to said supply containing means, means within said supply containing means including a vane rotating with said power driven rotating delivering means and a vane positioned adjacent to and above said rotating vane and responsive to the level of the powder in said supply containing means acting to arrest the operation of said flow inducing means when the level of the powder in the supply containing means reaches a predetermined level, a succession of powder receivers adapted to receive successive metered quantities of powder from said powder delivery means, means for advancing said succession of powder receivers past said powder delivering means, means associated with each of said powder receivers for positioning a container into association therewith in a position to receive powder from the receiver, and means for removing successive containers from association with their respective powder receivers after the powder has passed from the receivers into the containers.

5. Apparatus for filling containers with powder comprising means containing a supply of powder, power driven powder feed means for delivering successive quantities of powder from said supply containing means, a plurality of powder receivers in endless arrangement, said endless arrangement of receivers being movably mounted and arranged to pass said receivers successively under said powder delivering means when moved, means associated with each of said powder receivers for positioning a container into association therewith, means for removing each of the containers from association with its respective powder receiver after its receiver has advanced a predetermined distance from the location at which it received powder from the powder delivering means, means for driving said powder feed means and said movably mounted receivers, and means providing for driving of said receivers without driving of said powder delivering means for permitting movement of said movably mounted receivers without the discharge of powder thereto by the powder delivering means.

6. Apparatus for filling containers with powder comprising a plurality of powder receivers in circular arrangement, means rotatably mounting said circular arrangement of receivers, power driven means for rotating said circular arrangement of receivers, power driven means driven in synchronism with said power driven rotating means and positioned adjacent to said circular arrangement of receivers for delivering successive metered quantities of powder into successive receivers as the circular arrangement is rotated thereby, means associated with each of said receivers for positioning a container therebelow, depressable means for urging each positioned container upwardly into association with its powder receiver, and means for removing each of the containers from association with its respective powder receiver after its receiver has rotated a predetermined distance from the location at which it received powder from the powder delivering means, said container removing means including a rotatable wheel having a plurality of cutouts in its periphery each adapted to receive one of said containers, power driven means for rotating said rotatable wheel in synchronism with rotation of said circular arrangement of powder receivers, means in the vicinity of said rotatable wheel for depressing said means for urging the containers upwardly, a guide plate extending partially around the circumference of said rotatable wheel and positioned to engage containers resting upon the depressed means for urging the containers upwardly to guide said containers into the cutouts in said rotatable wheel, said rotatable wheel acting in conjunction with said guide plate to carry the containers engaged thereby out of their positions upon their associated depressed means for urging the containers upwardly.

7. Apparatus for filling containers with powder comprising a plurality of powder receivers in circular arrangement, power driven means rotatably mounting said circular arrangement of receivers, means for rotating said circular arrangement of receivers, power driven means driven in synchronism with said power driven rotating means and positioned adjacent to said circular arrangement of receivers for delivering successive metered quantities of powder into successive receivers as the circular arrangement is rotated thereby, means associated with each of said receivers for positioning a container therebelow, depressable means for urging each positioned container upwardly into association with its powder receiver, and means for removing each of the containers from association with its respective powder receiver after its receiver has rotated a predetermined distance from the location at which it received powder from the powder delivering means, said container removing means including a rotatable wheel having a plurality of cutouts in its periphery each adapted to receive one of said containers, means for rotating said rotatable wheel in synchronism with rotation of said circular arrangement of powder receivers, means in the vicinity of said rotatable wheel for depressing said means for urging the containers upwardly, means for urging the containers against their associated positioning means in the region where said means for urging the containers upwardly is depressed, a guide plate extending partially around the circumference of said rotatable wheel and positioned to engage containers resting upon the depressed means for urging the containers upwardly to guide said containers into the cutouts in said rotatable wheel, said rotatable wheel acting in conjunction with said guide plate to carry the containers engaged thereby out of their positions upon their associated depressed means for urging the containers upwardly.

References Cited in the file of this patent
UNITED STATES PATENTS

| | | |
|---|---|---|
| 993,230 | Englen | May 23, 1911 |
| 1,232,172 | Ayars | July 3, 1917 |
| 1,276,341 | Galleazzi | Aug. 20, 1918 |
| 1,489,938 | Hale | Apr. 8, 1924 |
| 2,169,573 | Vogt | Aug. 15, 1939 |
| 2,239,385 | Harder | Apr. 22, 1941 |
| 2,387,585 | Howard | Oct. 23, 1945 |
| 2,525,973 | Sundstrom | Oct. 17, 1950 |
| 2,568,332 | Genovese | Sept. 18, 1951 |